United States Patent [19]

Pischinger

[11] Patent Number: 4,696,270
[45] Date of Patent: Sep. 29, 1987

[54] COMBUSTION PROCESS FOR INTERNAL COMBUSTION ENGINE

[75] Inventor: Franz Pischinger, Aachen, Fed. Rep. of Germany

[73] Assignee: FEV Forschungsgesellschaft für Energietechnik und Verbrennungsmotoren mbH, Aachen, Fed. Rep. of Germany

[21] Appl. No.: 832,435

[22] Filed: Feb. 24, 1986

[30] Foreign Application Priority Data

Feb. 22, 1985 [DE] Fed. Rep. of Germany ....... 3506217

[51] Int. Cl.[4] .............................................. F02B 3/00
[52] U.S. Cl. ..................................... 123/274; 123/277; 123/275; 123/489
[58] Field of Search ............... 123/478, 489, 440, 274, 123/275, 277

[56] References Cited

U.S. PATENT DOCUMENTS

| 3,916,840 | 11/1975 | Geiger | 123/277 |
|---|---|---|---|
| 4,041,916 | 8/1977 | Iida | 123/274 |
| 4,150,545 | 4/1979 | Yamazaki | 123/274 |
| 4,193,382 | 3/1980 | Oshima | 123/474 |
| 4,210,105 | 7/1980 | Nohira | 123/277 |
| 4,236,490 | 12/1980 | Correll | 123/274 |
| 4,258,681 | 3/1981 | Gruden | 123/277 |
| 4,306,526 | 12/1981 | Schaub | 123/257 |
| 4,445,483 | 5/1984 | Hasegawa | 123/489 |
| 4,492,203 | 1/1985 | Vatuka | 123/478 |
| 4,574,753 | 3/1986 | Von Seggern | 123/277 |

FOREIGN PATENT DOCUMENTS

| 2611806 | 9/1976 | Fed. Rep. of Germany | 123/474 |
|---|---|---|---|
| 2606014 | 8/1977 | Fed. Rep. of Germany | 123/277 |

Primary Examiner—Ronald B. Cox
Attorney, Agent, or Firm—Watson, Cole, Grindle & Watson

[57] ABSTRACT

For a combustion procedure for internal combustion engines, in which a fuel-air mixture mixed with back-fed exhaust gas is introduced into a combustion chamber, a highly-combustible fuel-air mixture without back-fed exhaust gas in introduced into at least one precombustion chamber, which is connected by means of at least one opening with the combustion chamber.

2 Claims, 2 Drawing Figures

COMBUSTION PROCESS FOR INTERNAL COMBUSTION ENGINE

BACKGROUND OF THE INVENTION

This invention relates to a combustion process for internal combustion engines, in which a fuel-air mixed with back-fed exhaust gas is introduced into a combustion chamber.

In an effort to reduce the emission of harmful substances from internal combusion engines, it has been proposed that engines of this type be driven by a nearly stoichiometric fuel-air relationship and a subsequently added 3-way catalytic converter, in order to achieve the advantage of a simultaneous reduction of the three components of harmful emission, viz., $NO_x$, CO and CH.

However, this advantage is outweighed by considerable disadvantages. Due to the higher raw emission of the engine, correspondingly high emissions occur behind the catalytic converter, because of the failure to achieve a 100% conversion rate. In case of reduced efficiency of the catalytic converter, therefore, the danger of increased emissions exists. Also, the high thermic demands placed upon the engine may require a reduction of the stated efficiency, and the increased knock danger during operation with a nearly stoichiometric mixture may force reduction of the compression relationship, which worsens the actual degree of effectiveness. Finally, the quality coefficient is also negatively affected by the high process temperatures for nearly stoichiometric mixtures, due to high heat loss through the walls. It has recently been demonstrated that these disadvantages can be partially avoided by additional exhaust gas back-feed, as is set forth by Menne, Stojek and Cloke (VDI Reports #531, pp. 131-150) for the purpose of achieving an additional $NO_x$ reduction. The raw emission of $NO_x$ drops, and the back-fed exhaust gas acts as an inert component to reduce the process temperature so that the compression can be kept at a higher value. This process, on the other hand, has the disadvantage that the back-fed exhaust gas affects the speed of combustion and hence the actual degree of effectiveness. Also, misfiring can occur, which endangers the catalytic converter.

Low exhaust emissions can also be obtained with extreme reduction of the fuel-air relationship (in the range of excess air figures of 1.6 and above). Such a meager mode of operation, however, is only thermodynamically favorable under the condition of a safe ignition and a rapid burn-through. However, a further reduction of the $NO_x$ emission by means of a 3-way catalytic converter is not possible, due to the presence of oxygen in the exhaust. The known procedures for conditioning of the exhaust with ammonia-water mixtures and a subsequently-added catalytic converter (cf. e.g. Sturm, "Molecular sieve as a $NO_x$ catalytic converter", in *Sonnenergie und Waermepumpe* #2, 1984) enable a selective catalytic reduction of $NO_x$ emissions, but give rise to additional risks (working with $NH_3$, as well as $NH_3$ emissions). The currently known process for reduction of emissions of harmful substances in internal combustion engines rely on two contrary concepts for solving the problem:

The generally preferred solution is the measure of post-processing of the exhaust gas after the exit from the engine, and the best current process of this type is exhaust gas processing through so-called 3-way catalytic converters, in which the 3 components of the harmful emission, $NO_x$, carbon monoxides and hydrocarbons, are simultaneously reduced. This mode of operation, however, requires that the fuel-air relationship of the mixture to be burned indicate values in the nearly stoichiometric range, generally excess-air figures of approx. 0.99-1.01.

This mode of operation, however, has the disadvantage, mentioned above, that high raw emissions occur, and it is particularly disadvantageous in this connection that with reduced effectiveness of the catalytic converter, e.g., due to age or contamination, or with failure of the regulation system, the high raw emissions enter the environment either untreated or inadequately treated.

The opposite concept for solving the problem to the catalytic post-treatment of the exhaust gas in the prevention of the formation of harmful substances through measures designed to affect the combustion within the engine, whereby post-treatment is dispensed with. This approach is selected primarily because a failure of the post-treatment system leads to uncontrolled, relatively high emissions. A possibility for the realization of this concept is to mix exhaust gas into a stoichiometric fuel-air mixture, as mentioned by Menne, Stojek and Cloke (op. cit.) in a comparison of various operational processes for low-emission combustion engines, although they do not see this procedure as particularly advantageous. The admixture of exhaust gas achieves the reduction of the process temperatures and therefore the reduction in the creation of harmful substances. However, due to the limits set for admixture of exhaust gas, even this process cannot meet the high future requirements for freedom from harmful emissions. Also, the extreme dilution of the fuel-air relationship (in the range of excess-air figures of 1.6 and higher) does not permit this goal to be achieved, since catalytic post-treatment is impossible.

SUMMARY OF THE INVENTION

An object of the present invention is to overcome the aforedescribed difficulties by utilizing post-treatment of exhaust gas in addition to the measures taken within the engine. In this regard, however, the first problem that results is that the proportion of the back-fed exhaust gas in the overall mixtures (exhaust-gas back-feed rate) is limited by the worsened combustion properties of the fuel-air-exhaust mixtures to values up to 30%, so that the reduction of the raw emissions is also limited. A further difficulty results from the tendency to misfire, which increases with the degree of exhaust back-feed, and which in turn leads to inadmissibly high demands on the catalytic converter. An extreme dilution of the mixture to the range of excess-air figures of 1.6 and above is unacceptable for the reasons already described.

The invention addresses the problem of overcoming the limits and disadvantages of the known processes described, and of obtaining an effectiveness of reduction of emissions which has hitherto been considered unobtainable.

This problem is solved for a combustion process for internal combustion engines in which a fuel-air mixture mixed with back-fed exhaust gas which is introduced into a combustion chamber, by means of introducing a highly-combustible fuel-air mixture without back-fed exhaust gas into at least one precombustion chamber which is connected with the combustion chamber via at least one opening.

Additional advantageous characteristics of the invention are set forth in the appended claims.

Upon application of the invention, extremely low exhaust gas emissions can be obtained with extreme exhaust-gas back-feed. In order to ensure certain ignition of the mixture, a charge-layering is implemented. In one (or several) precombustion chamber(s) which contain a highly-combustible, approximately stoichiometric fuel-air mixture, combustion is initiated by means of an ignition spark. The combustion of this highly-combustible mixture provides sufficient ignition energy for the super-stoichiometric, poorly-combustible fuel-air mixture present in the main combustion chamber. The process temperatures are reduced considerably due to the meager mode of operation, which causes a low $NO_x$ emission. Any increases in CO and CH emissions can be reduced by means of an oxidation catalyzing converter added subsequently to the engine.

The meager mode of operation is thermodynamically favorable if a sure ignition and rapid burn-through is ensured. Higher compression relationships are possible without danger of knocking, and thermic demands on the engine parts are kept within limits.

The combustion chamber of an internal combustion engine operating according to the process of the invention is subdivided into a main combustion chamber delimited by the cylinder, piston and cylinder head, and one or more precombustion chambers which are connected with the main combustion chamber by way of one or more outflow channels. After the change of load between piston strokes, a nearly stoichiometric mixture of fuel and air with back-fed exhaust gas is present in the main combustion chamber. In the precombustion chamber, a nearly stoichiometric fuel-air mixture is contained. The combustion is initiated in the precombustion chamber, e.g., by an ignition spark. The highly-combustible nearly stoichiometric precombustion chamber mixture burns rapidly. The hot products of combustion and the front of the flame enter the main combustion chamber via the outflow channels with high thermal and kinetic energy, where the fuel-air mixture, which would be nearly stoichiometric but for the admixture of back-fed exhaust gas, is ignited and burns through with certainty.

This mode of operation ensures that the exhaust gas back-feed reduces the process temperature, which has a favorable effect both on the emission and the degree of process efficiency, as well as on the thermic demands on the engine. The ignition of the highly-combustible mixture in the precombustion chamber ensures a certain initiation of combustion as well as a good burn-through of the entire cylinder load. The mode of operation with a near-stoichiometric fuel-air relationship enables a further drastic reduction of the already low raw emissions of the engine by means of a subsequently-added 3-way catalytic converter.

Other objects, advantages and novel features of the invention will become more apparent from the following detailed description of the invention when taken together with the accompanying drawings.

DETAILED DESCRIPTION OF THE INVENTION

Figure 1:
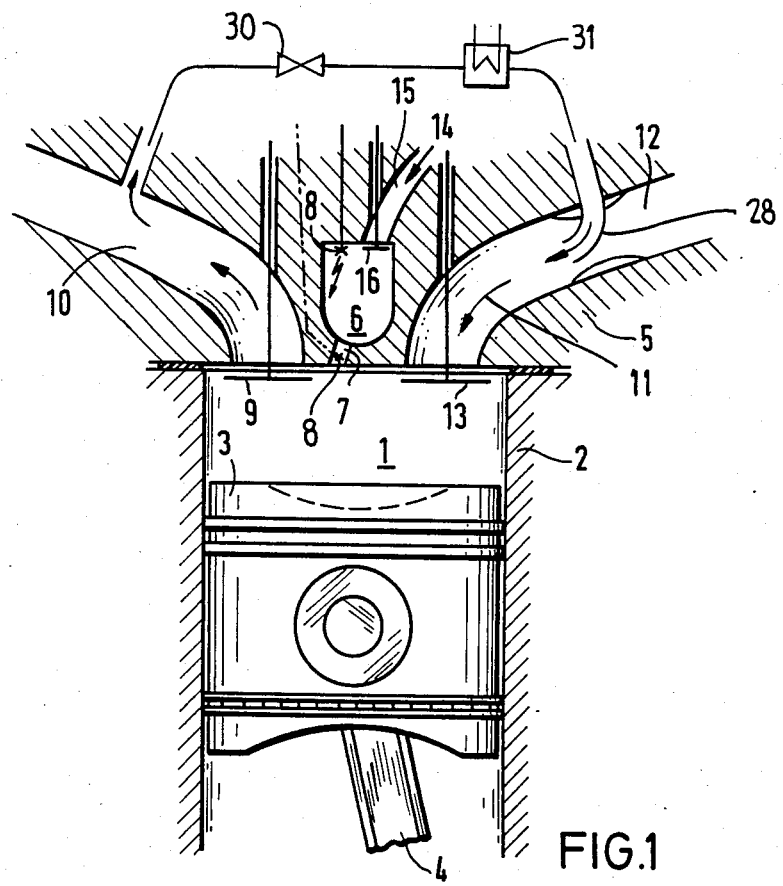
FIG. 1 schematically shows a longitudinal section through a piston-cylinder system, with the cylinder head of an internal combustion engine for carrying out the process according to the invention.

FIG. 1 shows an embodiment of the invention in the example of a 4-stroke lifting-cylinder of a multi-cylinder internal combustion engine. A main combustion chamber 1, which is delimited by a cylinder 2, a reciprocating piston 3 and a cylinder head 5, is connected with a precombustion chamber 6 via one or more openings 7 (only one being shown in the form of an outflow channel). The piston 2 is connected with a conventional crank assembly by means of a drive rod 4. In the precombustion chamber 6, a spark plug 8 is installed for initiating the combustion. Alternately, spark plug 8 may be located in channel 7 for initiating the combustion, as shown in phantom outline.

With the change in load, the exhaust gases flow through the momentarily opened valve 9 and a flow channel 10 in the cylinder head 5, and into the muffler system. Subsequently, a fresh mixture 11, comprising air, fuel and back-fed exhaust gas, flows through a channel 12 in the cylinder head and a now-opened valve 13 into the main combustion chamber 1. The fresh mixture 14, which, however, contains no back-fed exhaust gas, likewise flows through a channel 15 in the cylinder head and valve 16 into the precombustion chamber 6. A separate introduction of air and fuel into the precombustion chamber 6 is also possible.

Figure 2:
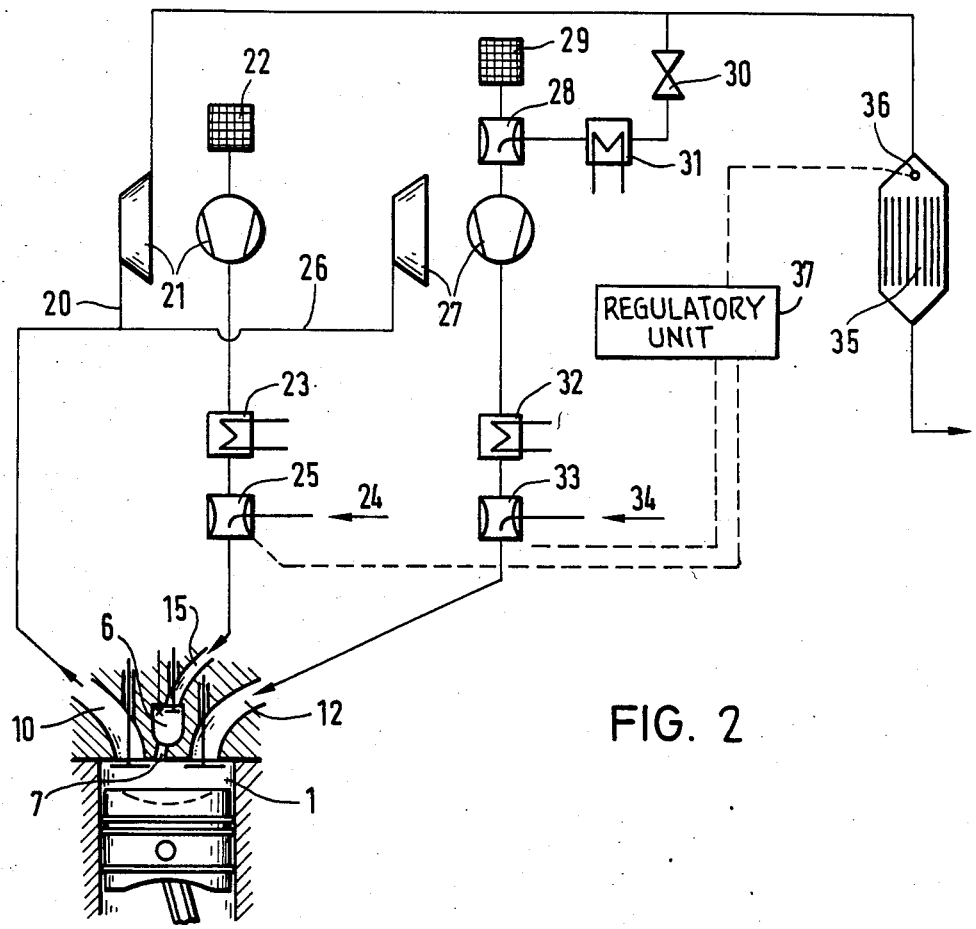
FIG. 2 schematically shows appropriate ancillary systems and installations included in the internal combustion engine and combined with the system of FIG. 1, for carrying out the invention.

FIG. 2 shows an advantageous embodiment of the engine and the ancillary systems with installations partly shown in FIG. 1. The exhaust gases which exit from the motor from the exit channels 10 are divided into two partial streams 20 and 26. The partial stream 20 flows through the turbines of an exhaust-gas turbo-supercharger 21 and thereby drives the compressor thereof which sucks in and compresses fresh air via an air filter 22. In a post-cooler 23, the fresh air is back-cooled and subsequently enters a mixer 25, in which fuel 24 is apportioned to the air, and both substances are mixed. The highly-combustible mixture that results flows through the channel 15 into the precombustion chamber 6. The residual gas present in the precombustion chamber is flushed out of the precombustion chamber via the outflow channel 7 by the inflowing fresh mixture.

The exhaust gas flow 26 flows through the turbine of an exhaust gas turbo-surpercharger 27, the compressor of which sucks in a mixture of fresh air and back-fed exhaust gas. This mixture is formed in a mixer 28 which mixes, according to a set relationship, the fresh air sucked in through the air filter 29 with the exhaust gas which is passed from gas flow 20a through a regulatory valve 30 and a cooler 31 to the mixer. The compressor of the exhaust gas turbo-supercharger 27 compresses this mixture. After back-cooling in a cooler 32, the air-exhaust-gas mixture is apportioned to the fuel 34 in a mixer 33 and mixed with it. The air-exhaust gas-fuel mixture flows into the main combustion chamber 1 of the engine via the channel 12.

The mode of operation with a nearly stoichiometric fuel-air relationship enables the already low raw emission of the engine to be further drastically reduced by means of a three-way catalytic converter subsequently added to it.

The installations required for this purpose are represented in FIG. 2. The exhaust gas flows through a catalytic converter 35 (3-way catalytic converter), and at the entry there the oxygen content of the exhaust gas is measured by means of a suitable probe 36. The measurement signal of the probe 36 is directed to a regulatory unit 37, which transmits control signals to the mixters 25 and 33, which provide for the maintenance of a nearly stoichiometric relationship between the total of the sucked-in combustion air and the fuel added. With the maintenance of these marginal conditions, the harmful components of the exhaust are chemically transformed in the catalytic converter.

Alternative arrangements and features of the invention are also made possible in carrying out the invention. For example, the ignition may take place not in the precombustion chamber but rather in connection channel 7 between the main combustion chamber and the precombustion chamber, as shown in phantom outline in FIG. 1. Also, air may be introduced into the (or one of the) precombustion chamber(s) at load change, and self-ignitable fuel may be introduced toward the end of the compression, in accordance with the diesel engine combustion process. It is also possible to introduce only fuel into the (or one of the) combustion chamber(s).

It may also be advantageous, instead of, with the 3-way catalytic converter 35, setting or regulating the relationship of the entire flow of added fuel or air masses in the nearly stoichiometric range, to rather, with the 3-way catalytic converter 35 and an unregulated combustion relationship of the precombustion chamber load (as by eliminating transmission of control signals to mixer 25), set or regulate the relationship of the air introduced into the combustion chamber to the fuel introduced such that the relationship of the totality of fuel added to the engine to the totality of the combustion air introduced to the engine produces values in the nearly stoichiometric range.

According to the existing state of the art, it is considered possible to obtain, with the aid of intra-engine measures and consistent further development, levels of emission of harmful substances as low as those obtained through post-treatment by 3-way catalytic converters.

A combination of optimal results of the two basically counterposed measures for the purpose of obtaining still lower levels of emission has hitherto not been considered possible, due to the feared disadvantageous effect on the catalytic converter, particularly due to the increased tendency to misfire. This also led Menne, Stojek and Cloke (op.cit.) to give a negative evaluation of such a combination even for moderate intra-engine measures, due to considerations of long-term stability. The present invention, on the other hand, demonstrates novel and advantageous possibilities for solution to the problem. With the operation of an internal combustion engine according to the teachings of this invention, the low level of emission of the harmful substances $NO_x$, Co and CH of hitherto unknown quality can be obtained.

What is claimed is:

1. A combustion process for a compression ignition internal combustion engine having a main combustion chamber and at least one precombustion chamber connected with said combustion chamber by at least one opening, introducing at least a fuel into said precombustion chamber, separately introducing fuel, air and recirculated exhaust gas directly into said combustion chamber for producing an admixture therein, and igniting said admixture, providing a 3-way catalyst connected to the flow of exhaust gas from said combustion chamber, and measuring the oxygen content of the exhaust gas entering said catalyst for regulating the ratio of fuel and air entering said combustion and pre-combustion chambers in a nearly stoichiometric range.

2. The process according to claim 1, comprising the further steps or maintaining an unregulated air fuel ratio of the precombustion chamber charges, and measuring the oxygen content of the exhaust gas entering said catalyst for regulating the ratio of fuel and air introduced directly into said combustion chamber such that the total amount of fuel added to the engine produces values in the nearly stoichiometric range.

* * * * *